US012776162B2

(12) United States Patent
Yu et al.

(10) Patent No.: US 12,776,162 B2
(45) Date of Patent: Oct. 27, 2026

(54) COMBINING BODY AND TARGET REGIONS FOR IDENTIFICATION OF A HUMAN ACTION WITH RESPECT TO AN OBJECT

(71) Applicant: MICROSOFT TECHNOLOGY LICENSING, LLC, Redmond, WA (US)

(72) Inventors: Pei Yu, Bellevue, WA (US); Ying Jin, Kirkland, WA (US); Zicheng Liu, Bellevue, WA (US); Yinpeng Chen, Sammamish, WA (US); Khawar Mahmood Zuberi, Bellevue, WA (US); Amit Bahree, Bellevue, WA (US); Joost-Paul Coebergh, Newcastle, WA (US); Rehab Sabri, Snohomish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 139 days.

(21) Appl. No.: 18/812,576

(22) Filed: Aug. 22, 2024

(65) Prior Publication Data

US 2026/0057705 A1 Feb. 26, 2026

(51) Int. Cl.

*G06V 40/20* (2022.01)
*G06V 10/25* (2022.01)
*G06V 10/26* (2022.01)
*G06V 10/32* (2022.01)
*G06V 10/80* (2022.01)

(52) U.S. Cl.

CPC .............. *G06V 40/25* (2022.01); *G06V 10/25* (2022.01); *G06V 10/26* (2022.01); *G06V 10/32* (2022.01); *G06V 10/803* (2022.01); *G06V 40/28* (2022.01)

(58) Field of Classification Search

None

See application file for complete search history.

(56) References Cited

U.S. PATENT DOCUMENTS

| | | | | |
|---|---|---|---|---|
| 2019/0286892 | A1* | 9/2019 | Li | G06N 3/045 |
| 2022/0405501 | A1* | 12/2022 | Chowdhury | G06T 7/74 |
| 2023/0039867 | A1* | 2/2023 | Li | G06F 18/251 |

FOREIGN PATENT DOCUMENTS

| | | | |
|---|---|---|---|
| CN | 113628172 | A | 11/2021 |

OTHER PUBLICATIONS

Extended European search report received in European Application No. 25195117.4, mailed on Jan. 21, 2026, 09 pages.

* cited by examiner

*Primary Examiner* — Leon Flores

(74) *Attorney, Agent, or Firm* — Newport IP, LLC; Jacob P. Rohwer

(57) ABSTRACT

A system uses a single vision model to combine lower resolution images of a body and higher resolution images of a targeted body part to more efficiently identify a human action with respect to an object. The system receives images of a scene that include a body. For instance, the images may be sequential frames in a video captured by a camera. The system generates a body image by extracting a region from an image that includes a body. The system generates a target image by extracting a region from the image that includes a targeted body part interacting with an object. The system is configured to perform similar operations on the body image and the target image to ensure that a single vision model can process the target image at a more granular level compared to the body image.

20 Claims, 7 Drawing Sheets

COMBINING BODY AND TARGET REGIONS FOR IDENTIFICATION OF A HUMAN ACTION WITH RESPECT TO AN OBJECT

Identifying a human action within images (e.g., video frames) of a scene is a challenging task for computer vision systems. More specifically, an object a human is interacting with (e.g., holding in a hand) provides a contextual signal that assists in identifying the human action. Unfortunately, most of the types of objects a human interacts with are quite small (e.g., fit within a hand). Accordingly, computer vision systems require high resolution images to reliably identify a small object with which a human is interacting. A high resolution image significantly increases the amount of time needed for computer vision systems to process the image, e.g., to identify the small object with which the human is interacting. The increased amount of time introduces a delay that is infeasible to many of the applications that use such computer vision systems. For instance, applications that operate in various domains (e.g., augmented reality, robotics, industrial safety, and security) require object identification to occur in near real-time, and thus, it is difficult for these applications to rely on computer vision systems that process high resolution images due to the delay.

SUMMARY

The system disclosed herein is configured to use a vision model to combine lower resolution images of a body and higher resolution images of a targeted body part to more efficiently identify a human action with respect to an object. As described herein, the system receives images of a scene that includes a body. For instance, the images may be sequential frames in a video captured by a camera. These images may be referred to herein as "original" images. The system generates a body image by extracting a region from an original image that includes a body (referred to herein as a "body" region). The system generates a target image by extracting a region from the original image that includes a targeted body part interacting with an object (referred to herein as a "target" region). In examples discussed herein, the targeted body party is a hand. However, other body parts can interact with objects, and therefore, can be targeted in the context of this disclosure (e.g., a foot, a head).

The system is configured to use a single vision model to process both the body image and the target image to avoid extra hardware requirements for loading separate vision models for both the body image and the target image. Thus, the vision model described herein performs similar operations on the body image and the target image, yet the operations are performed on the target image at a more granular level compared to the body image via the use of different image resolutions. To do this, the system generates an input body image by resizing the extracted body image to a first predefined size. The system generates an input target image by resizing the target image to a second predefined size. The resizing operations are required because the vision model requires fixed input sizes for input images. The more granular level operation performance is achieved because the second predefined size represents a resolution that is higher than the resolution represented by the first predefined size. Accordingly, in relation to each other, the input body image may be referred to herein as a "lower" resolution image and the input target image may be referred to herein as a "higher" resolution image. In one example, the first predefined size for the input body image is "384×288" pixels and the second predefined size for the input target image is "128×128" pixels. It is noted that, for humans, the body region is proportionally much larger than the target region in the original image. Therefore, the second predefined size for the input target image is more granular compared to the first predefined size for the input body image.

By representing the body region in a lower resolution image rather than a higher resolution image, the system described herein is able to efficiently recognize a coarse pose and/or motion of the entire body. This recognition with respect to the entire body is relevant to identifying a human action with respect to an object but does not require higher resolution images for accurate identification. In contrast, by representing the target region in the image in a higher resolution image rather than a lower resolution image, the system can better capture the granular details of smaller objects and the smaller targeted body parts (e.g., a shape of a hand, an orientation of a hand, a shape of an object, an orientation of an object).

Existing computer vision systems typically ignore the rich and complementary information that can be obtained from a target region. This ignorance is intentional to ensure the performance of computer vision systems satisfies a time constraint. Consequently, the identification accuracy of a human action suffers when using existing computer vision systems in domains (e.g., augmented reality, robotics, industrial safety, and security) that require object identification to occur in near real-time.

Now that the system has an input body image and an input target image in predefined sizes, the system divides the input images into non-overlapping patches of a fixed size. The fixed size is defined by the configuration of the vision model. More specifically, the system divides the input body image into a first set of non-overlapping patches of the fixed size and the system divides the input target image into a second set of non-overlapping patches of the fixed size. In one example, the fixed size of a patch is "16×16" pixels.

The system then provides the first set of non-overlapping patches and the second set of non-overlapping patches as inputs to a vision model. The vision model is configured to learn and/or maintain positional embeddings for the input body image. A positional embedding for the input body image indicates a source position, in the original image, for each patch in the first set of non-overlapping patches. The vision model is further configured to generate positional embeddings for the input target image by interpolating from the positional embeddings for the input body image based on a tracked location of the targeted body part in the original image. Thus, the positional embedding for the input target image indicates a source position, in the original image, for each patch in the second set of non-overlapping patches.

The vision model injects positional information into an image patch by adding a positional embedding token to the image patch. Therefore, each positional embedding may be referred to as a token that corresponds to a unique grid (e.g., area) in the original image. Accordingly, the tokens generated by the vision model described herein cover the body region in the original image at a lower resolution for more efficient processing. Moreover, the tokens generated by the vision model cover the target region (e.g., a hand) in the original image at a higher resolution for improved accuracy with respect to identification of an object and how the targeted body part is interacting with the object. In contrast, the tokens used in existing computer vision systems all have the same resolution, and thus, do not distinguish between the level of detail in the body region and the target region.

The vision model produces, as a first output of a transformer encoder, a first fused token (e.g., a [CLS] token) that summarizes over both the body image and the target image for object identification (e.g., classification) purposes. Furthermore, the vision model produces, as a second output of the transformer encoder, a second fused token (e.g., a different [CLS] token) that summarizes over both the body image and the target image for human action identification purposes. The vision model is then configured to use the first fused token and a first classifier to identify the object and use the second fused token and a second classifier to identify the human action being performed by the body (e.g., the entire body with a focus on the targeted body part) within the scene with respect to the object. Consequently, the system receives, from the vision model, the identification of the object and the identification of the human action being performed by the body within the scene with respect to the object.

The fusion approach implemented by the disclosed system eliminates the need to use multiple vision models to separately process the body region and the target region at different resolutions, and then merge the outputs of the multiple vision models. Consequently, compute resources, as well as time, are conserved yet the performance of the vision model with respect to accuracy is maintained. That is, the combination, or fusing, of the two input images maintains a high level of accuracy as if the whole body had been processed via a higher resolution image.

By simultaneously considering the shapes, orientations, and movements of the entire body, the targeted body parts (e.g., hands), and the object, the system enables a comprehensive understanding of how a human is interacting with the object in the scene. Stated alternatively, the system described herein ensures that the intricacies of human interaction with small(er) objects are accurately captured, and thus, the techniques described herein can be used across a wide range of domains.

In various embodiments, the system is configured to generate a notification that alerts an entity (e.g., an application) with respect to the identification of an action that the human body conducts with respect to the object. For example, the entity may be an augmented reality application configured to perform an operation based on a body movement and a specific hand gesture implemented with respect to a specific type of object. In another example, the entity may be a safety monitoring application configured to alert a supervisor of an industrial warehouse or manufacturing line when a worker is performing a human action based on an interaction with a dangerous object that has been deemed unsafe and/or violates safety policies. In yet another example, the entity may be a security monitoring application configured to alert a security agent when a human action and a type of object (e.g., a weapon, a rock, a crow bar) indicates a potential situation that can be harmful to property or other humans.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques and technologies disclosed herein use a vision model to combine lower resolution images of a body and higher resolution images of a targeted body part to more efficiently identify a human action with respect to an object. As described herein, the system receives images of a scene that include a body. For instance, the images may be sequential frames in a video captured by a camera. These images may be referred to herein as "original" images. The system generates a body image by extracting a region from an original image that includes a body (referred to herein as a "body" region). The system generates a target image by extracting a region from the original image that includes a targeted body part interacting with an object (referred to herein as a "target" region). In examples discussed herein, the targeted body party is a hand. However, other body parts can interact with objects, and therefore, can be targeted in the context of this disclosure (e.g., a foot, a head). As further described herein, the system is configured to perform similar operations on the body image and the target image to ensure that a single vision model can process both the body image and the target image.

Various examples, scenarios, and aspects of the disclosed techniques that use a vision model to combine lower resolution images of a body and higher resolution images of a targeted body part to more efficiently identify a human action with respect to an object are described below with reference to FIGS. 1-6.

Figure 1:
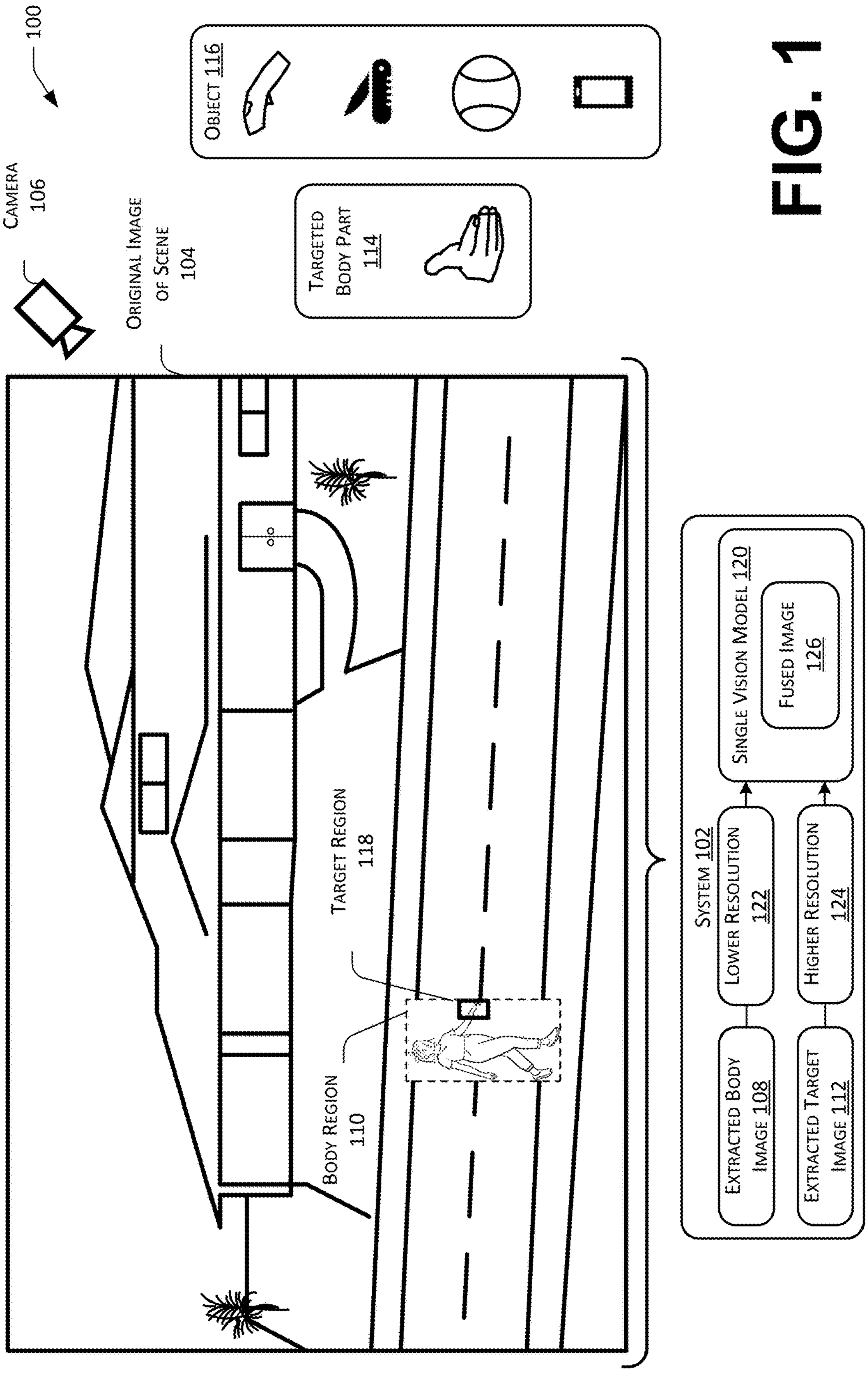
FIG. 1 is a diagram illustrating an example environment in which a system combines lower resolution images of a body and higher resolution images of a targeted body part (e.g., a hand) to more efficiently identify a human action with respect to an object.

FIG. 1 is a diagram illustrating an example environment 100 in which a system 102 combines lower resolution images of a body and higher resolution images of a targeted body part (e.g., a hand) to more efficiently identify a human action with respect to an object. The system 102 receives an original image of a scene 104 (referred to herein as original image 104). The original image 104 includes a body. In one example, the original image 104 is part of a set of sequential frames in a video captured by a camera 106. In the example of FIG. 1, the original image 104 reflects a human walking in front of a house.

The system 102 generates an extracted body image 108 by extracting a region from the original image 104 that includes a body (referred to herein as a "body" region 110). The system 102 generates an extracted target image 112 by extracting a region from the original image 104 that includes a targeted body part 114 interacting with an object 116 (referred to herein as a "target" region 118). The mechanism the system 102 uses to extract the body region 110 and the target region 118 is further discussed below with respect to FIGS. 3A and 3B.

As shown in the example of FIG. 1, the targeted body party 114 is a hand. However, other body parts can interact with objects 116, and therefore, can be targeted in the context of this disclosure (e.g., a foot, a head). In domains such as augmented reality, robotics, industrial safety, and security, a particular type of object 116 a human is interacting with, as well as an orientation and/or shape of the targeted body part 114 interacting with the object 116, is a significant indicator of a human action that is taking place within the scene. For instance, human actions can be vastly different depending on whether a human is holding an electronic controller, a pocket knife, a baseball, or a smartphone, each of which is illustrated as an example object 116 in FIG. 1.

Unfortunately, existing computer vision systems typically process images at lower resolutions to ensure the performance satisfies a time constraint. Consequently, the rich and complementary information that can be obtained from the target region 118 is ignored and the accuracy related to identifying a human action suffers when using existing computer vision systems in domains that require object identification and/or human action identification to occur in near real-time.

The system 102 is configured to perform similar operations on the extracted body image 108 and the extracted target image 112 to ensure that a single vision model 120 can process the extracted target image 112 at a more granular level compared to the extracted body image 108. That is, as further described below, the vision model 120 is able to process the extracted body image 108 at a lower resolution 122 when compared to a higher resolution 124 at which the vision model 120 process the extracted target image 112. The processing enables the vision model 120 to perform accurate and efficient object and human action identification using a fused image 126. In one example, the vision model 120 is a vision transformer (e.g., ViT-B/16) By representing the body region 110 in a lower resolution 122 image rather than a higher resolution 124 image, the system 102 described herein is able to efficiently recognize a coarse pose and/or motion of the entire body. This recognition with respect to the entire body is relevant to identifying human action with respect to an object 116 but typically does not require higher resolution images for accurate identification (e.g., due to the larger size of a human body). In contrast, by representing the target region 118 in the original image 104 in a higher resolution 124 image rather than a lower resolution 122 image, the system 102 can better capture the granular details of smaller objects 116 and the smaller targeted body parts 114 (e.g., a shape of a hand, an orientation of a hand, a shape of an object, an orientation of an object).

Figure 2:
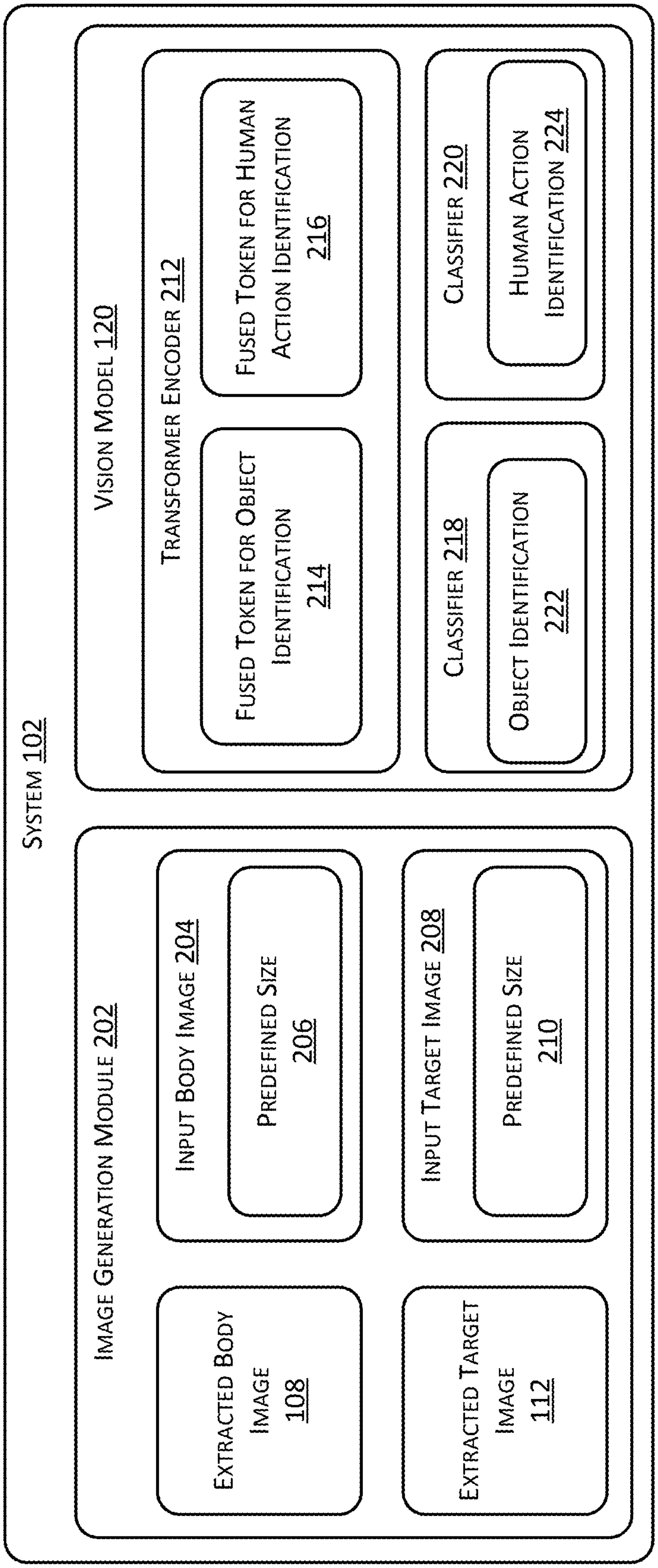
FIG. 2 is a diagram illustrating further components of the system introduced in FIG. 1.

FIG. 2 is a diagram illustrating further components of the system 102 introduced in FIG. 1. As shown, the system 102 includes an image generation module 202 and the vision model 120. The image generation module 202 is configured to resize both the extracted body image 108 and the extracted target image 112. The resizing operations are required because the vision model 120 requires fixed input sizes for input images.

Specifically, the image generation module 202 generates an input body image 204 by resizing the extracted body image 108 to a first predefined size 206. The image generation module 202 further generates an input target image 208 by resizing the extracted target image 112 to a second predefined size 210. It is noted that, for humans, the body region 110 is proportionally much larger than the target region 118 in the original image 104. Therefore, the second predefined size 210 for the input target image 208 is more granular compared to the first predefined size 206 for the input body image 204. Stated alternatively, in relation to each other, the input body image 204 may be referred to as a "lower" resolution 122 image while the input target image 208 may be referred to as a "higher" resolution 124 image. This is further described below in the example of FIGS. 3A and 3B.

The image generation module 202 then provides the separate input body image 204 and the separate input target image 208 to the vision model 120. The vision model 120 inputs the input body image 204 and the input target image 208 to a transformer encoder 212. The transformer encoder 212 is trained to generate a first fused token 214 (e.g., a [CLS] token) that summarizes both the input body image 204 and the input target image 208 for object identification (e.g., classification) purposes. Furthermore, the transformer encoder 212 is trained to generate a second fused token 216 (e.g., another [CLS] token) that summarizes both the input body image 204 and the input target image 208 for human action identification purposes. The vision model 120 is then configured to use the first fused token 214 and a first classifier 218 to identify the object. Moreover, the vision model 120 is configured to use the second fused token 216 and a second classifier 220 to identify the human action being performed by the body (e.g., the entire body with a focus on the targeted body part) within the scene with respect to the object. Consequently, the system 102 receives, from the vision model 120, the identification of the object 222 and the identification of the human action 224 being performed by the body within the scene with respect to the object.

Existing computer vision systems generate a single set of embeddings using a single input image and use a single token for multiple classification purposes. In contrast, the system 102 is able to generate two different fused tokens for two purposes, with each fused token summarizing over two separate input images. Accordingly, the two different fused tokens allow for separate classifications to be performed in two dimensions. That is, the first fused token 214 is dedicated to a first dimension related to identifying an object with which a targeted body part (e.g., a hand) is interacting. In contrast, the second fused token 216 is dedicated to a second dimension related to identifying the human action that is being implemented with respect to the identified object.

Figure 3A:
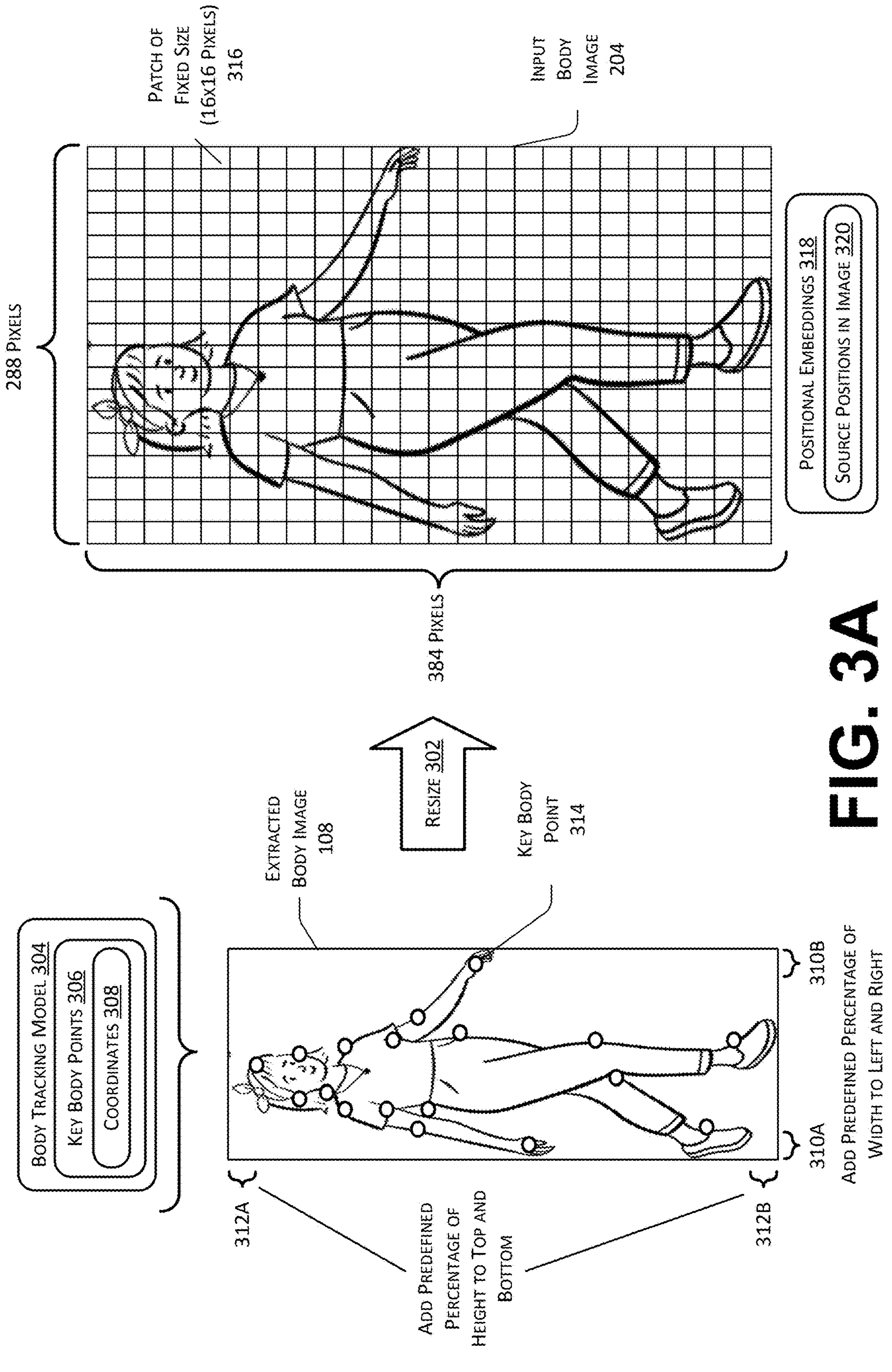
FIG. 3A is a diagram illustrating a resizing operation for a body image extracted from an original image.

FIG. 3A is a diagram illustrating a resizing operation 302 for the body image 108 extracted from the original image 104. Before the resizing operation 302 occurs, the image generation module 202 uses a body tracking model 304 to identify the body region 110 within the original image and to extract the body image 108. The body tracking model 304 is trained to detect key body points 306 and associate the key body points 306 with coordinates 308 in the original image 104. In the example of FIG. 3A, there are eighteen key body points 306 that are represented by a small circle (o) and that outline the body of the human in the scene.

The image generation module 202 uses the key body points 306 to essentially generate a bounding box that defines the body region 110 and that represents the extracted body image 108. In various examples, the image generation module 202 enlarges the bounding box to extend a width and/or a height of the body region 110 and the extracted body image 108. This ensures the body region 110 and the extracted body image 108 covers the entire human body. More specifically, the image generation model 202 is configured to determine a width (e.g., distance) between the left most key body point 306 and the right most key body point 306. Then, the image generation model 202 extends the width by adding a predefined percentage (e.g., 5%, 10%, 20%) of the width to the left and right of the bounding box, as represented by 310A and 310B. Similarly, the image generation model 202 is configured to determine a height between the top most key body point 306 and the bottom most key body point 306. Then, the image generation model 202 extends the height by adding a predefined percentage (e.g., 5%, 10%, 20%) of the height to the top and bottom of the bounding box, as represented by 312A and 312B.

As further described below with respect to FIG. 3B, the image generation module 202 extracts the target image 112 based on a coordinate of a key body point 314 that corresponds to the targeted body part 114, such as the hand in the example of FIG. 3A.

Now that the image generation module 202 has the extracted body image 108 via the use of the body tracking model 304, the image generation module 202 performs the resizing operation 302 that converts the extracted body image 108 into the input body image 204 sized in accordance with the first predefined size 206 specified by the vision model 120. In the example of FIG. 3A, the first predefined size 206 for the input body image 204 is "384×288" pixels. The image generation module 202 then divides the input body image 204 into a first set of non-overlapping patches of a fixed size 316. In the example of FIG. 3A, the fixed size of a patch is "16×16" pixels. Accordingly, FIG. 3A illustrates that the width of the input body image 204 is represented in eighteen patches (e.g., "288/16=18") while the height of the input body image 204 is represented in twenty-four patches (e.g., "384/16=24").

The image generation module 202 then provides the first set of non-overlapping patches to the vision model 120. The vision model 120 is configured to learn and/or maintain positional embeddings 318 for the input body image 204. A positional embedding 318 indicates a source position 320, in the original image 104, for each patch in the first set of non-overlapping patches. Each positional embedding 318 may be referred to as a token that corresponds to a unique grid (e.g., area) in the original image 104. Accordingly, the tokens generated by the vision model 120 cover the body region 110 in the original image 104 at a lower resolution for more efficient processing.

Figure 3B:
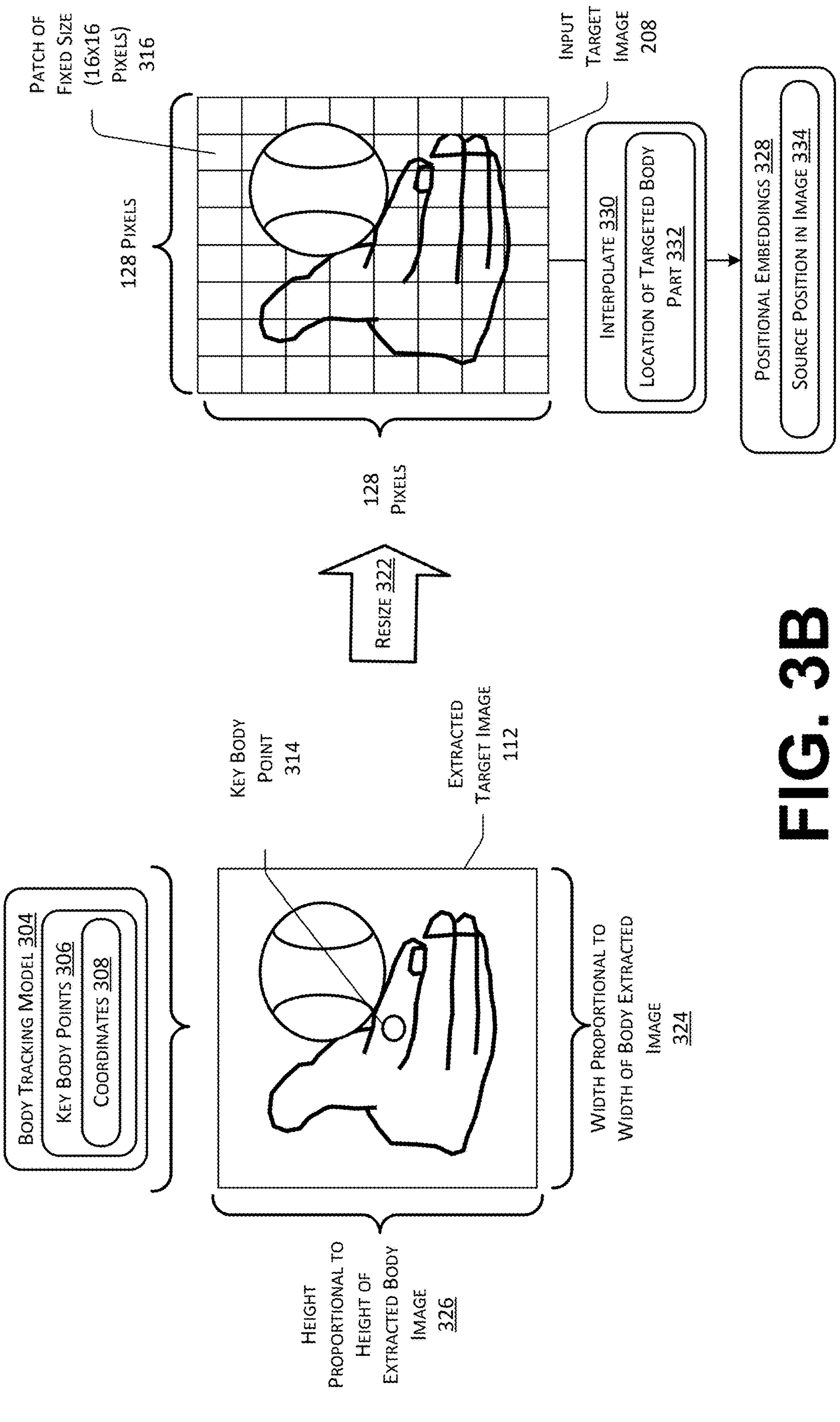
FIG. 3B is a diagram illustrating a resizing operation for a target image extracted from an original image.

FIG. 3B is a diagram illustrating a resizing operation 322 for a target image 112 extracted from the original image 104. As mentioned above, the image generation module 202 is able to extract the target image 112 based on a coordinate of a key body point 314 that corresponds to the targeted body part 114. Using the key body point 314 as a center, the width of the extracted target image 112 is a defined proportion (e.g., 10%) of the width of the extracted body image 108, as represented by 324. Moreover, using the key body point 314 as a center, the height of the extracted target image 112 is a defined proportion (e.g., 5%) of the height of the extracted body image 108, as represented by 326. Consequently, via the use of the body tracking model 304, the image generation module 202 is able to crop out the target region 118 (e.g., capturing a hand holding a baseball). It is noted that the techniques described herein can extract more than one target image 112 from an original image 104. For example, a target image 112 can be extracted for each of two hands that are part of a typical human body.

Now that the image generation module 202 has the extracted target image 112 via the use of the body tracking model 304, the image generation module 202 performs the resizing operation 322 that converts the extracted target image 112 into the input target image 208 sized in accordance with the second predefined size 210 specified by the vision model 120. In the example of FIG. 3B, the second predefined size 210 for the input target image 208 is "128×128" pixels. The image generation module 202 then divides the input target image 208 into a second set of non-overlapping patches of the fixed size 316. Accordingly, FIG. 3B illustrates that the width of the input target image 208 is represented in eight patches (e.g., "128/16=8") while the height of the input target image 208 is also represented in eight patches (e.g., "128/16=8").

The image generation module 202 then provides the second set of non-overlapping patches to the vision model 120. The vision model 120 generates positional embeddings 328 for the input target image 208 by interpolating 330 from the positional embeddings 318 based on a tracked location 332 (e.g., the coordinate of the key body point 314) of the targeted body part 114 in the original image 104. A positional embedding 328 indicates a source position 334, in the original image 104, for each patch in the second set of non-overlapping patches. Each positional embedding 328 may also be referred to as a token that corresponds to a unique grid (e.g., area) in the original image 104. Accordingly, the tokens generated by the vision model 120 cover the target region 118 in the original image 104 at a higher resolution to ensure accurate identification of an object 116 and a human action being taken with respect to the object 116.

The vision model 120 provides both the first set of image patches and positional embeddings 318 of the input body image 204 and the second set of image patches and positional embeddings 328 of the input target image 208 to a transformer encoder. The vision model 120 is then configured to receive and/or produce, as a first output of a transformer encoder, the first fused token 214 (e.g., a [CLS] token) that summarizes over both the first set of image patches and first positional embeddings 318 of the input body image 204 and the second set of image patches and second positional embeddings 328 of the input target image 208, for object identification (e.g., classification) purposes. Furthermore, the vision model 120 produces, as a second output of the transformer encoder, a second fused token 216 (e.g., a different [CLS] token) that summarizes over both the first set of image patches and positional embeddings 318 of the input body image 204 and the second set of image patches and positional embeddings 328 of the input target image 208, for human action identification purposes.

The fusion approach implemented by the system 102 eliminates the need to use multiple vision models to separately process the body region 110 and the target region 118 at different resolutions 122, 124, and then merge the outputs of the multiple vision models. Consequently, compute resources, as well as time, are conserved yet the performance of the vision model 120 with respect to accuracy is maintained. That is, the combination, or fusing, of the two input images 204, 208 maintains a high level of accuracy as if the whole body had been processed via a higher resolution image.

By simultaneously considering the shapes, orientations, and movements of the entire body, the targeted body parts (e.g., hands), and the object, the system 102 enables a comprehensive understanding of how a human is interacting with the object 116 in the scene. Stated alternatively, the system 102 ensures that the intricacies of human interaction with small(er) objects are accurately captured, and thus, the techniques described herein can be used across a wide range of domains.

Figure 4:
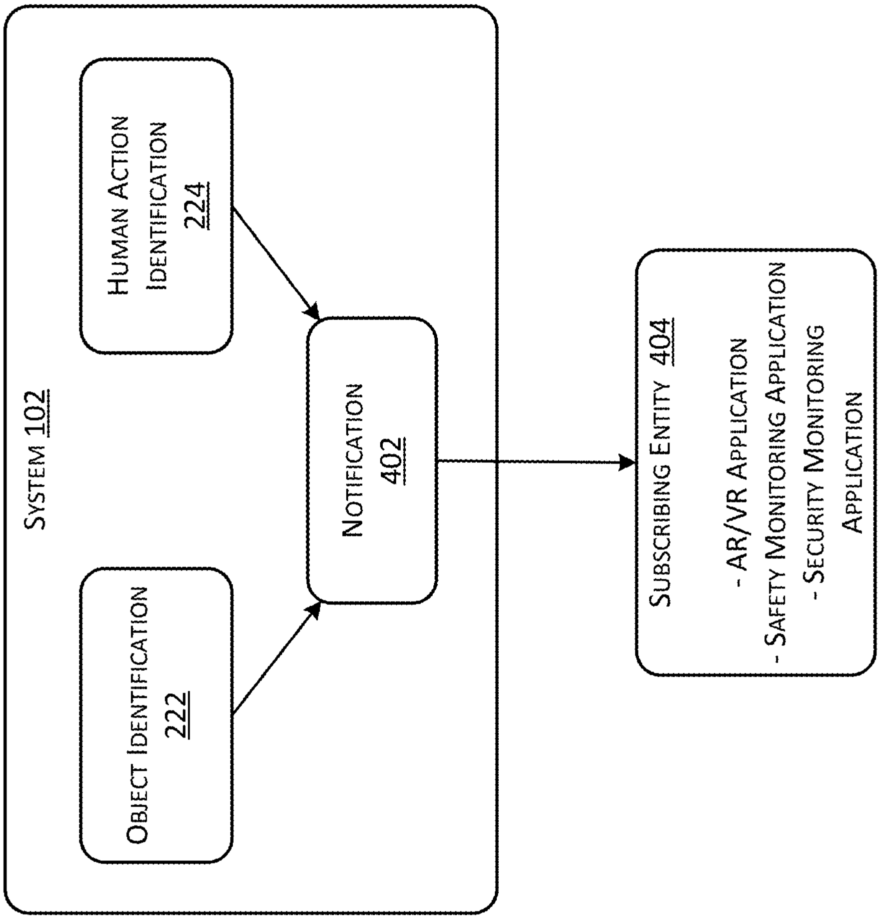
FIG. 4 is a diagram illustrating how a notification that includes an identification of an object and an identification of a human action being performed with respect to the object can be provided to an entity.

FIG. 4 is a diagram illustrating how a notification 402 that includes an identification of the object 222 and the identification of a human action 224 being conducted with respect to the object can be provided to a subscribing entity 404. In one example, the entity 404 may be a virtual reality (VR) and/or augmented reality (AR) application configured to perform an operation based on a body movement and a specific hand gesture implemented with respect to a specific type of object. In another example, the entity 404 may be a safety monitoring application configured to alert a supervisor of an industrial warehouse or manufacturing line when a worker is performing a human action based on an interaction with a dangerous object that has been deemed unsafe and/or violates safety policies. In yet another example, the entity 404 may be a security monitoring application configured to alert a security agent when a human action and a type of object (e.g., a weapon, a rock, a crow bar) indicates a potential situation that can be harmful to property or other humans.

Figure 5:
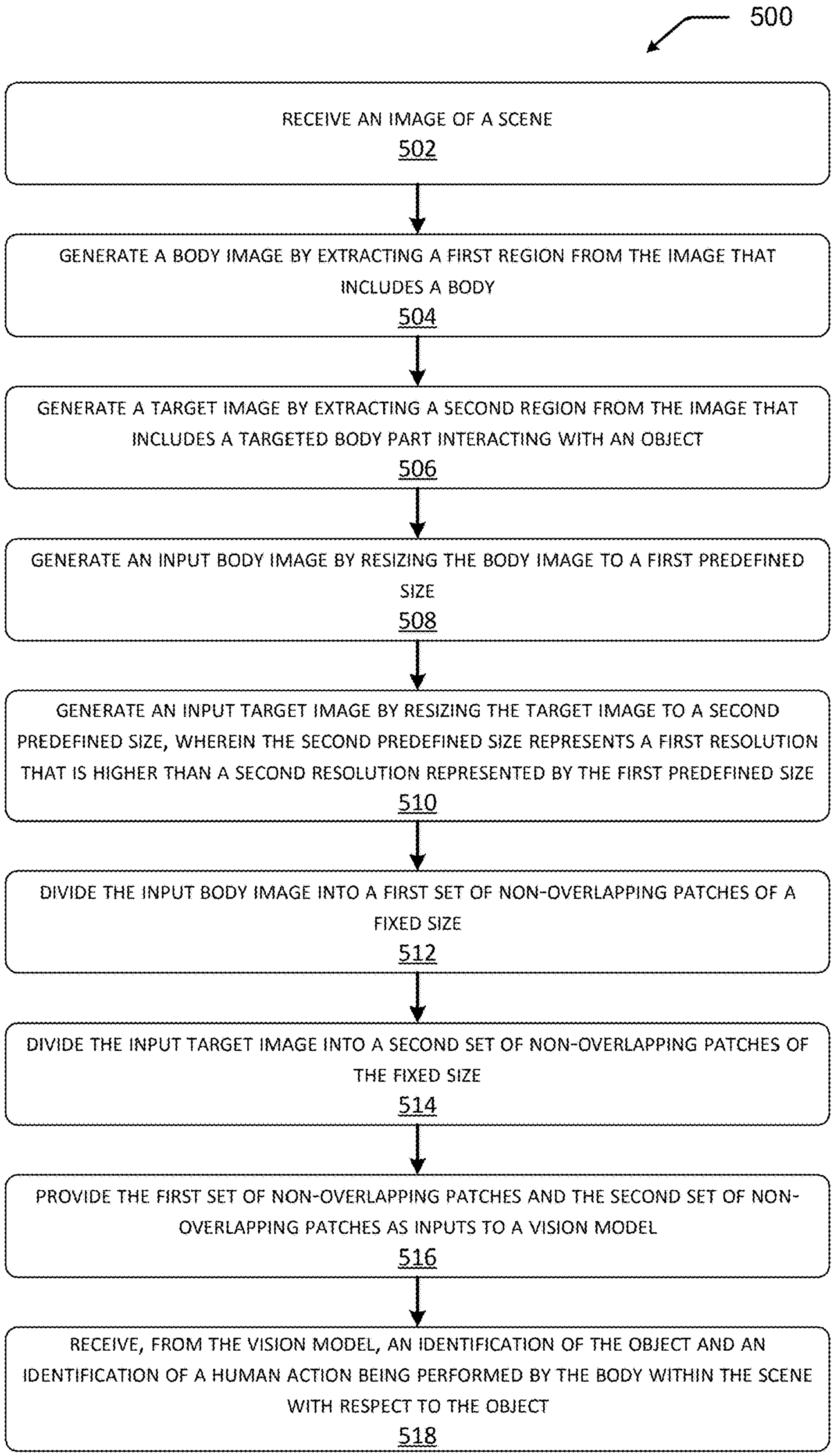
FIG. 5 is a flow diagram showing aspects of a method for combining a lower resolution image of a body and higher resolution image of a targeted body part (e.g., a hand) to more efficiently identify a human action with respect to an object.

Proceeding to FIG. 5, aspects of a method 500 for combining a lower resolution image of a body and higher resolution image of a targeted body part (e.g., a hand) to more efficiently identify a human action with respect to an object are shown. With respect to FIG. 5, the method 500 begins at operation 502 where the system receives an image of a scene.

At operation 504, the system generates a body image by extracting a first region from the image that includes a body.

At operation 506, the system generates a target image by extracting a second region from the image that includes a targeted body part interacting with an object.

At operation 508, the system generates an input body image by resizing the body image to a first predefined size.

At operation 510, the system generates an input target image by resizing the target image to a second predefined size. As described above, the second predefined size represents a first resolution that is higher than a second resolution represented by the first predefined size.

At operation 512, the system divides the input body image into a first set of non-overlapping patches of a fixed size.

At operation 514, the system divides the input target image into a second set of non-overlapping patches of the fixed size.

At operation 516, the system provides the first set of non-overlapping patches and the second set of non-overlapping patches as inputs to a vision model.

At operation 518, the system receives, from the vision model, an identification of the object and an identification of a human action being performed by the body within the scene with respect to the object.

For ease of understanding, the method discussed in this disclosure is delineated as separate operations represented as independent blocks. However, these separately delineated operations should not be construed as necessarily order dependent in their performance. The order in which the method is described is not intended to be construed as a limitation, and any number of the described method blocks may be combined in any order to implement the method or an alternate method. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the method 500 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the method 500 may also be implemented in other ways. In addition, one or more of the operations of the method 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
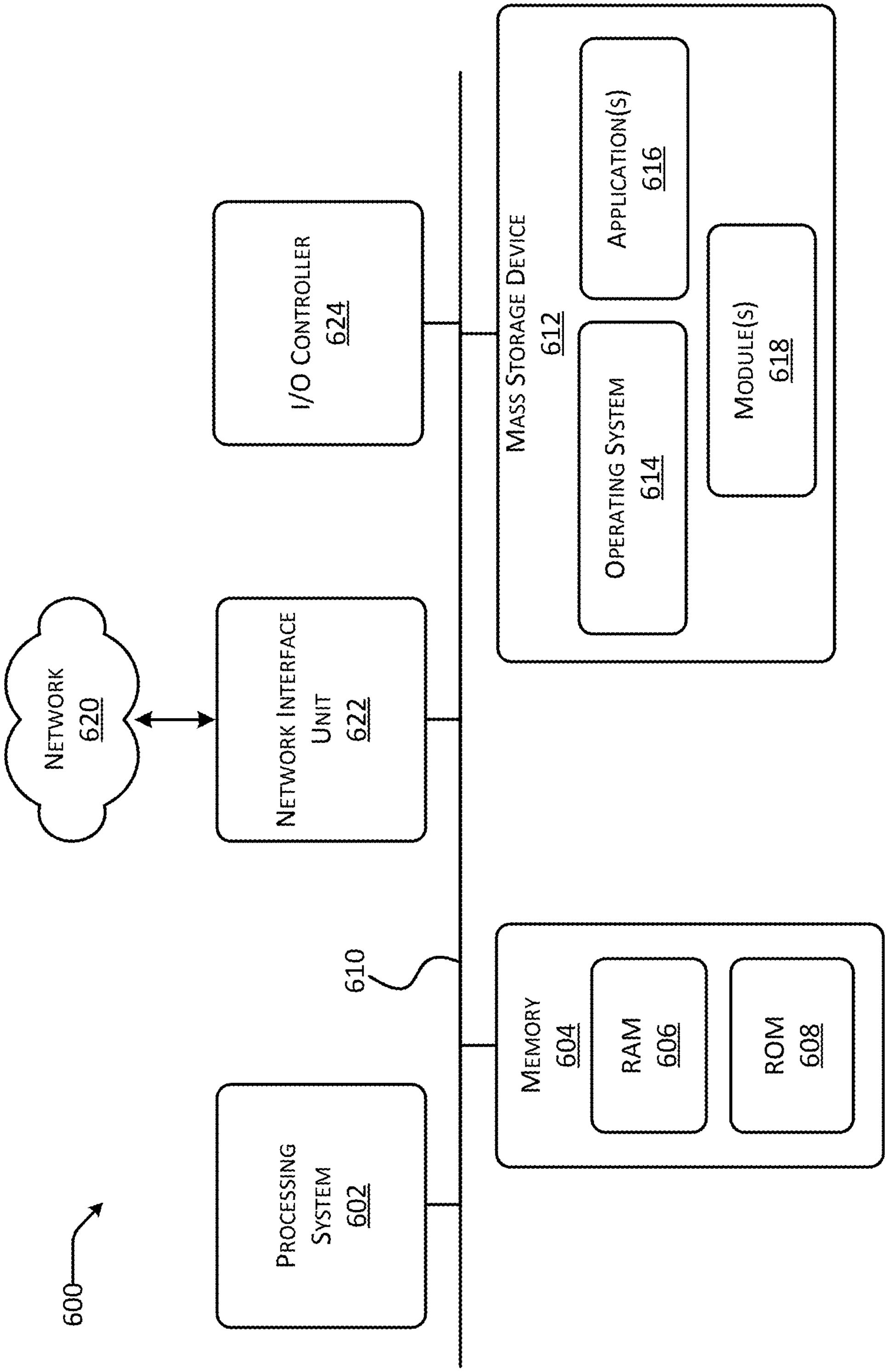
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the system 102, capable of executing computer instructions (e.g., a module described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

The disclosure presented herein also encompasses the subject matter set forth in the following clauses.

Example Clause A, a method comprising: receiving an image of a scene; generating a body image by extracting a first region from the image that includes a body; generating a target image by extracting a second region from the image that includes a targeted body part interacting with an object; generating an input body image by resizing the body image to a first predefined size; generating an input target image by resizing the target image to a second predefined size, wherein the second predefined size represents a resolution that is higher than the first predefined size; dividing the input body image into a first set of non-overlapping patches of a fixed size; dividing the input target image into a second set of non-overlapping patches of the fixed size; providing the first set of non-overlapping patches and the second set of non-overlapping patches as inputs to a vision model; and receiving, from the vision model, an identification of the object and an identification of a human action being performed by the body within the scene with respect to the object.

Example Clause B, the method of Example Clause A, wherein the vision model is configured to: generate first positional embeddings for the first set of image patches; generate second positional embedding for the second set of image patches by interpolating from the first positional embeddings based on a tracked location of the target body part; provide the first set of image patches and the first positional embeddings and the second set of image patches and the second positional embeddings to a transformer encoder; receive, as a first output of the transformer encoder, a first fused token that summarizes the input body image and the input target image for object identification purposes; receive, as a second output of the transformer encoder, a second fused token that summarizes the input body image and the input target image for human action identification purposes; use the first fused token to identify the object; and use the second fused token to identify the human action being performed by the body within the scene with respect to the object.

Example Clause C, the method of Example Clause A or Example Clause B, wherein: the first region is extracted by a body tracking model trained to detect key body points and to associate the key body points with coordinates of the image; and the method further comprises generating the body image by: determining a width between a left most key body point and a right most key body point; extending the width on a left side and on a right side by a first predefined percentage of the width, wherein the extended width corresponds to a width of the body image; determining a height between a top most key body point and a bottom most key body point; and extending the height on a top side and on a bottom side by a second predefined percentage of the height, wherein the extended height corresponds to a height of the body image.

Example Clause D, the method of Example Clause C, wherein the method further comprises generating the target image by: determining a coordinate of a key body point that corresponds to the targeted body part; setting a width of the target image as a second predefined proportion of the width of the body image centered at the coordinate of the key body point that corresponds to the targeted body part; and setting a height of the target image as a first predefined proportion of the height of the body image centered at the coordinate of the key body point that corresponds to the targeted body part.

Example Clause E, the method of any one of Example Clauses A through D, wherein: the first predefined size is 384×288 pixels; the second predefined size is 128×128 pixels; and the fixed size is 16×16 pixels.

Example Clause F, the method of any one of Example Clauses A through E, further comprising generating a notification that includes the identification of the object and the identification of the human action being performed by the body within the scene with respect to the object.

Example Clause G, the method of Example Clause F, further comprising sending the notification to a subscribing entity that operates in an augmented reality domain, a safety domain, or a security domain.

Example Clause H, a system comprising: a processing system; and a computer-readable medium storing instructions that, when executed by the processing system, cause the system to perform operations comprising: receiving an image of a scene; generating a body image by extracting a first region from the image that includes a body; generating a target image by extracting a second region from the image that includes a targeted body part interacting with an object; generating an input body image by resizing the body image to a first predefined size; generating an input target image by resizing the target image to a second predefined size, wherein the second predefined size represents a resolution that is higher than the first predefined size; dividing the input body image into a first set of non-overlapping patches of a fixed size; dividing the input target image into a second set of non-overlapping patches of the fixed size; providing the first set of non-overlapping patches and the second set of non-overlapping patches as inputs to a vision model; and receiving, from the vision model, an identification of the object and an identification of a human action being performed by the body within the scene with respect to the object.

Example Clause I, the system of Example Clause H, wherein the vision model is configured to: generate first positional embeddings for the first set of image patches; generate second positional embedding for the second set of image patches by interpolating from the first positional embeddings based on a tracked location of the target body part; provide the first set of image patches and the first positional embeddings and the second set of image patches and the second positional embeddings to a transformer encoder; receive, as a first output of the transformer encoder, a first fused token that summarizes the input body image and the input target image for object identification purposes; receive, as a second output of the transformer encoder, a second fused token that summarizes the input body image and the input target image for human action identification purposes; use the first fused token to identify the object; and use the second fused token to identify the human action being performed by the body within the scene with respect to the object.

Example Clause J, the system of Example Clause H or Example Clause I, wherein: the first region is extracted by a body tracking model trained to detect key body points and to associate the key body points with coordinates of the image; and the operations further comprise generating the body image by: determining a width between a left most key body point and a right most key body point; extending the width on a left side and on a right side by a first predefined percentage of the width, wherein the extended width corresponds to a width of the body image; determining a height between a top most key body point and a bottom most key body point; and extending the height on a top side and on a bottom side by a second predefined percentage of the height, wherein the extended height corresponds to a height of the body image.

Example Clause K, the system of Example Clause J, wherein the operations further comprise generating the target image by: determining a coordinate of a key body point that corresponds to the targeted body part; setting a width of the target image as a second predefined proportion of the width of the body image centered at the coordinate of the key body point that corresponds to the targeted body part; and setting a height of the target image as a first predefined proportion of the height of the body image centered at the coordinate of the key body point that corresponds to the targeted body part.

Example Clause L, the system of any one of Example Clauses H through K, wherein: the first predefined size is 384×288 pixels; the second predefined size is 128×128 pixels; and the fixed size is 16×16 pixels.

Example Clause M, the system of any one of Example Clauses H through L, wherein the operations further comprise generating a notification that includes the identification of the object and the identification of the human action being performed by the body within the scene with respect to the object.

Example Clause N, the system of Example Clause M, wherein the operations further comprise sending the notification to a subscribing entity that operates in an augmented reality domain, a safety domain, or a security domain.

Example Clause O, a computer-readable storage medium storing instructions that, when executed by a processing system, cause a system to perform operations comprising: receiving an image of a scene; generating a body image by extracting a first region from the image that includes a body; generating a target image by extracting a second region from the image that includes a targeted body part interacting with an object; generating an input body image by resizing the body image to a first predefined size; generating an input target image by resizing the target image to a second predefined size, wherein the second predefined size represents a resolution that is higher than the first predefined size; dividing the input body image into a first set of non-overlapping patches of a fixed size; dividing the input target image into a second set of non-overlapping patches of the fixed size; providing the first set of non-overlapping patches and the second set of non-overlapping patches as inputs to a vision model; and receiving, from the vision model, an identification of the object and an identification of a human action being performed by the body within the scene with respect to the object.

Example Clause P, the computer-readable storage medium of Example Clause O, wherein the vision model is configured to: generate first positional embeddings for the first set of image patches; generate second positional embedding for the second set of image patches by interpolating from the first positional embeddings based on a tracked location of the target body part; provide the first set of image patches and the first positional embeddings and the second set of image patches and the second positional embeddings to a transformer encoder; receive, as a first output of the transformer encoder, a first fused token that summarizes the input body image and the input target image for object identification purposes; receive, as a second output of the transformer encoder, a second fused token that summarizes the input body image and the input target image for human action identification purposes; use the first fused token to identify the object; and use the second fused token to identify the human action being performed by the body within the scene with respect to the object.

Example Clause Q, the computer-readable storage medium of Example Clause O or Example Clause P, wherein: the first region is extracted by a body tracking model trained to detect key body points and to associate the key body points with coordinates of the image; and the operations further comprise generating the body image by: determining a width between a left most key body point and a right most key body point; extending the width on a left side and on a right side by a first predefined percentage of the width, wherein the extended width corresponds to a width of the body image; determining a height between a top most key body point and a bottom most key body point; and extending the height on a top side and on a bottom side by a second predefined percentage of the height, wherein the extended height corresponds to a height of the body image.

Example Clause R, the computer-readable storage medium of Example Clause Q, wherein the operations further comprise generating the target image by: determining a coordinate of a key body point that corresponds to the targeted body part; setting a width of the target image as a second predefined proportion of the width of the body image centered at the coordinate of the key body point that corresponds to the targeted body part; and setting a height of the target image as a first predefined proportion of the height of the body image centered at the coordinate of the key body point that corresponds to the targeted body part.

Example Clause S, the computer-readable storage medium of any one of Example Clauses O through R, wherein the operations further comprise generating a notification that includes the identification of the object and the identification of the human action being performed by the body within the scene with respect to the object.

Example Clause T, the computer-readable storage medium of Example Clause S, wherein the operations further comprise sending the notification to a subscribing entity that operates in an augmented reality domain, a safety domain, or a security domain.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method comprising:

receiving an image of a scene;

generating a body image by extracting a first region from the image that includes a body;

generating a target image by extracting a second region from the image that includes a targeted body part interacting with an object;

generating an input body image by resizing the body image to a first predefined size;

generating an input target image by resizing the target image to a second predefined size, wherein the second predefined size represents a resolution that is higher than the first predefined size;

dividing the input body image into a first set of non-overlapping patches of a fixed size;

dividing the input target image into a second set of non-overlapping patches of the fixed size;

providing the first set of non-overlapping patches and the second set of non-overlapping patches as inputs to a vision model; and receiving, from the vision model, an identification of the object and an identification of a human action being performed by the body within the scene with respect to the object.

2. The method of claim 1, wherein the vision model is configured to:

generate first positional embeddings for the first set of non-overlapping patches;

generate second positional embeddings for the second set of image patches by interpolating from the first positional embeddings based on a tracked location of the targeted body part;

provide the first set of non-overlapping patches and the first positional embeddings and the second set of non-overlapping patches and the second positional embeddings to a transformer encoder;

receive, as a first output of the transformer encoder, a first fused token that summarizes the input body image and the input target image for object identification purposes;

receive, as a second output of the transformer encoder, a second fused token that summarizes the input body image and the input target image for human action identification purposes;

use the first fused token to identify the object; and use the second fused token to identify the human action being performed by the body within the scene with respect to the object.

3. The method of claim 1, wherein:

the first region is extracted by a body tracking model trained to detect key body points and to associate the key body points with coordinates of the image; and the method further comprises generating the body image by:

determining a width between a left most key body point and a right most key body point;

extending the width on a left side and on a right side by a first predefined percentage of the width, wherein the extended width corresponds to a width of the body image;

determining a height between a top most key body point and a bottom most key body point; and extending the height on a top side and on a bottom side by a second predefined percentage of the height, wherein the extended height corresponds to a height of the body image.

4. The method of claim 3, wherein the method further comprises generating the target image by:

determining a coordinate of a key body point that corresponds to the targeted body part;

setting a width of the target image as a second predefined proportion of the width of the body image centered at the coordinate of the key body point that corresponds to the targeted body part; and setting a height of the target image as a first predefined proportion of the height of the body image centered at the coordinate of the key body point that corresponds to the targeted body part.

5. The method of claim 1, wherein:

the first predefined size is 384×288 pixels;

the second predefined size is 128×128 pixels; and the fixed size is 16×16 pixels.

6. The method of claim 1, further comprising generating a notification that includes the identification of the object and the identification of the human action being performed by the body within the scene with respect to the object.

7. The method of claim 6, further comprising sending the notification to a subscribing entity that operates in an augmented reality domain, a safety domain, or a security domain.

8. A system comprising:

a processing system; and a computer-readable medium storing instructions that, when executed by the processing system, cause the system to perform operations comprising:

receiving an image of a scene;

generating a body image by extracting a first region from the image that includes a body;

generating a target image by extracting a second region from the image that includes a targeted body part interacting with an object;

generating an input body image by resizing the body image to a first predefined size;

generating an input target image by resizing the target image to a second predefined size, wherein the second predefined size represents a resolution that is higher than the first predefined size;

dividing the input body image into a first set of non-overlapping patches of a fixed size;

dividing the input target image into a second set of non-overlapping patches of the fixed size;

providing the first set of non-overlapping patches and the second set of non-overlapping patches as inputs to a vision model; and receiving, from the vision model, an identification of the object and an identification of a human action being performed by the body within the scene with respect to the object.

9. The system of claim 8, wherein the vision model is configured to:

generate first positional embeddings for the first set of non-overlapping patches;

generate second positional embeddings for the second set of non-overlapping patches by interpolating from the first positional embeddings based on a tracked location of the targeted body part;

provide the first set of non-overlapping patches and the first positional embeddings and the second set of non-overlapping patches and the second positional embeddings to a transformer encoder;

receive, as a first output of the transformer encoder, a first fused token that summarizes the input body image and the input target image for object identification purposes;

receive, as a second output of the transformer encoder, a second fused token that summarizes the input body image and the input target image for human action identification purposes;

use the first fused token to identify the object; and use the second fused token to identify the human action being performed by the body within the scene with respect to the object.

10. The system of claim 8, wherein:

the first region is extracted by a body tracking model trained to detect key body points and to associate the key body points with coordinates of the image; and the operations further comprise generating the body image by:

determining a width between a left most key body point and a right most key body point;

extending the width on a left side and on a right side by a first predefined percentage of the width, wherein the extended width corresponds to a width of the body image;

determining a height between a top most key body point and a bottom most key body point; and extending the height on a top side and on a bottom side by a second predefined percentage of the height, wherein the extended height corresponds to a height of the body image.

11. The system of claim 10, wherein the operations further comprise generating the target image by:

determining a coordinate of a key body point that corresponds to the targeted body part;

setting a width of the target image as a second predefined proportion of the width of the body image centered at the coordinate of the key body point that corresponds to the targeted body part; and setting a height of the target image as a first predefined proportion of the height of the body image centered at the coordinate of the key body point that corresponds to the targeted body part.

12. The system of claim 8, wherein:

the first predefined size is 384×288 pixels;

the second predefined size is 128×128 pixels; and the fixed size is 16×16 pixels.

13. The system of claim 8, wherein the operations further comprise generating a notification that includes the identification of the object and the identification of the human action being performed by the body within the scene with respect to the object.

14. The system of claim 13, wherein the operations further comprise sending the notification to a subscribing entity that operates in an augmented reality domain, a safety domain, or a security domain.

15. A computer-readable storage medium storing instructions that, when executed by a processing system, cause a system to perform operations comprising:

receiving an image of a scene;

generating a body image by extracting a first region from the image that includes a body;

generating a target image by extracting a second region from the image that includes a targeted body part interacting with an object;

generating an input body image by resizing the body image to a first predefined size;

generating an input target image by resizing the target image to a second predefined size, wherein the second predefined size represents a resolution that is higher than the first predefined size;

dividing the input body image into a first set of non-overlapping patches of a fixed size;

dividing the input target image into a second set of non-overlapping patches of the fixed size;

providing the first set of non-overlapping patches and the second set of non-overlapping patches as inputs to a vision model; and receiving, from the vision model, an identification of the object and an identification of a human action being performed by the body within the scene with respect to the object.

16. The computer-readable storage medium of claim 15, wherein the vision model is configured to:

generate first positional embeddings for the first set of non-overlapping patches;

generate second positional embeddings for the second set of non-overlapping patches by interpolating from the first positional embeddings based on a tracked location of the targeted body part;

provide the first set of non-overlapping patches and the first positional embeddings and the second set of non-overlapping patches and the second positional embeddings to a transformer encoder;

receive, as a first output of the transformer encoder, a first fused token that summarizes the input body image and the input target image for object identification purposes;

receive, as a second output of the transformer encoder, a second fused token that summarizes the input body image and the input target image for human action identification purposes;

use the first fused token to identify the object; and use the second fused token to identify the human action being performed by the body within the scene with respect to the object.

17. The computer-readable storage medium of claim 15, wherein:

the first region is extracted by a body tracking model trained to detect key body points and to associate the key body points with coordinates of the image; and the operations further comprise generating the body image by:

determining a width between a left most key body point and a right most key body point;

extending the width on a left side and on a right side by a first predefined percentage of the width, wherein the extended width corresponds to a width of the body image;

determining a height between a top most key body point and a bottom most key body point; and extending the height on a top side and on a bottom side by a second predefined percentage of the height, wherein the extended height corresponds to a height of the body image.

18. The computer-readable storage medium of claim 17, wherein the operations further comprise generating the target image by:

determining a coordinate of a key body point that corresponds to the targeted body part;

setting a width of the target image as a second predefined proportion of the width of the body image centered at the coordinate of the key body point that corresponds to the targeted body part; and setting a height of the target image as a first predefined proportion of the height of the body image centered at the coordinate of the key body point that corresponds to the targeted body part.

19. The computer-readable storage medium of claim 15, wherein the operations further comprise generating a notification that includes the identification of the object and the identification of the human action being performed by the body within the scene with respect to the object.

20. The computer-readable storage medium of claim 19, wherein the operations further comprise sending the notification to a subscribing entity that operates in an augmented reality domain, a safety domain, or a security domain.

* * * * *